United States Patent

Suzuki et al.

[11] 3,850,518
[45] Nov. 26, 1974

[54] OSCILLOSCOPE PHOTOGRAPHING SYSTEM

[75] Inventors: Kazu Suzuki; Kazuo Shimo, both of Tokyo, Japan

[73] Assignee: Hewlett-Packard Company, Palo Alto, Calif.

[22] Filed: Aug. 27, 1973

[21] Appl. No.: 392,392

[30] Foreign Application Priority Data
Aug. 28, 1972  Japan.............................. 47-85963

[52] U.S. Cl................ 354/76, 346/110 R, 354/166, 355/55
[51] Int. Cl....................... G03b 29/00, G03b 13/20
[58] Field of Search........ 95/44 C, 12, 11 V; 356/3, 356/8; 355/52, 55, 63, 18; 354/3, 166, 162, 163, 164, 75, 76, 80; 346/110

[56] References Cited
UNITED STATES PATENTS
2,249,589  7/1941  Woodbury..........................  354/162
2,418,108  3/1947  Simmon..............................  95/44 C
3,638,549  2/1972  Kazu Suzuki.......................  95/44 C

*Primary Examiner*—John M. Horan
*Assistant Examiner*—Kenneth C. Hutchison
*Attorney, Agent, or Firm*—A. C. Smith

[57] ABSTRACT

In a photographic system a camera and a movable optical apparatus are disposed on a support rail and are used to take high-fidelity views at close range of images displayed on the screen of a cathode ray tube. The movable optical apparatus includes mirrors and prisms disposed to transport light rays from images on the screen under observation to the camera viewfinder and to correct distorted images as viewed during focusing of the camera on the screen of the cathode ray tube.

3 Claims, 5 Drawing Figures

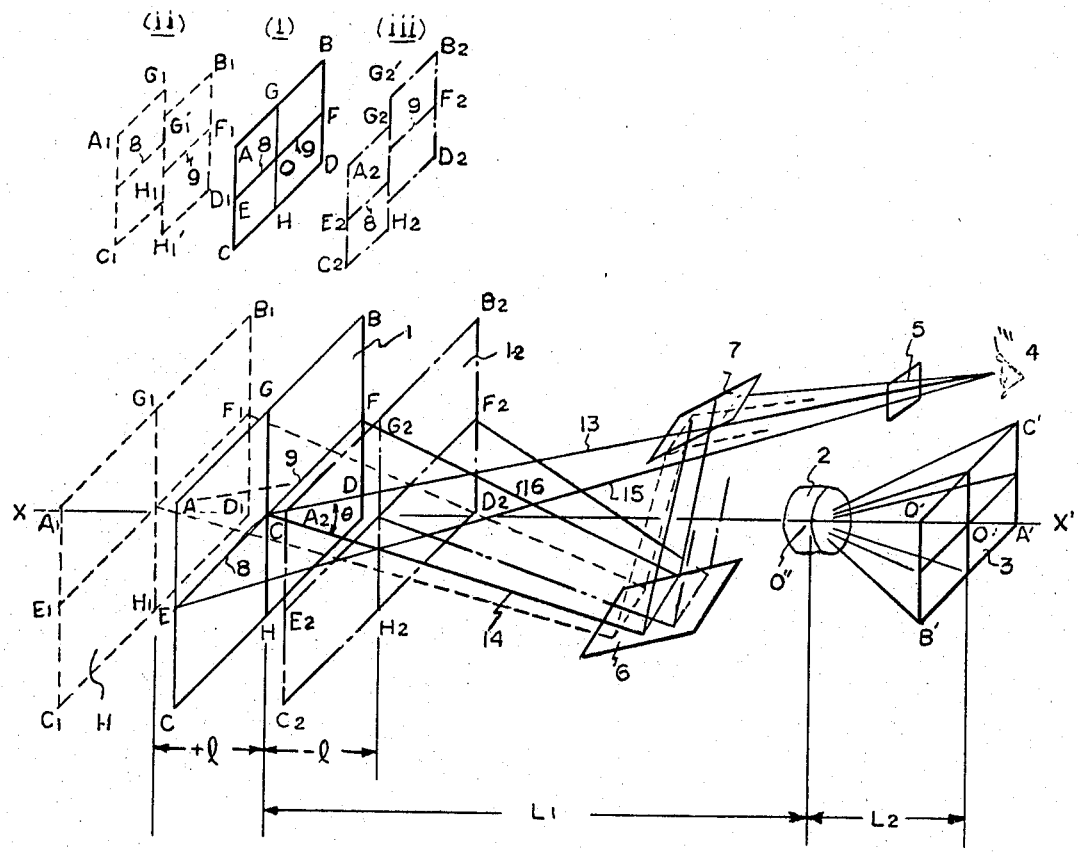
FIG. 5
FIG. 1
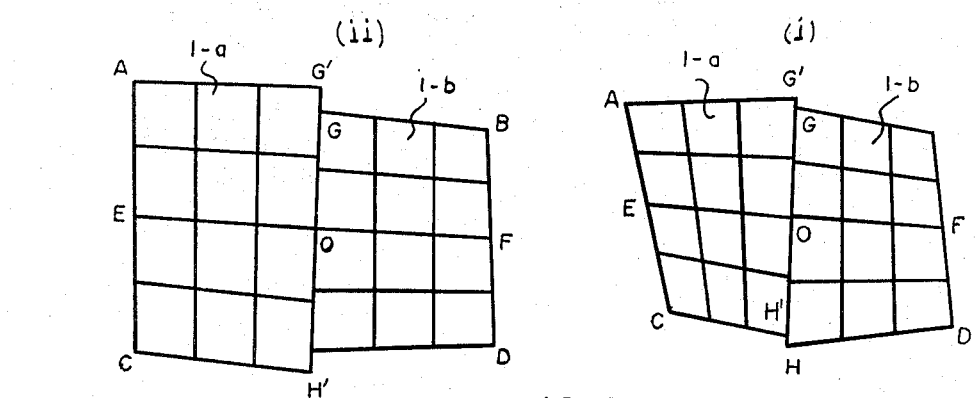
FIG. 2

OSCILLOSCOPE PHOTOGRAPHING SYSTEM

SUMMARY OF THE INVENTION

The apparatus of the present invention includes a camera which faces the fluorescent surface (i.e. screen) of a cathode ray tube and is disposed to adjust the distance between the screen and the camera lens, and also includes a movable base on which the camera is mounted to adjust the above distance between the camera lens and the screen. The present invention also includes optical apparatus which is movable with the base and which is employed to observe two separate portions of the screen to be photographed from a single viewing point by means of separate light paths. This optical apparatus, mounted on the movable base, includes a reflecting element which changes the direction of light rays included in one of the above light paths. The above separate light paths strike the photographed domain at different angles. In a standard position where the distance between the screen and the camera is adjusted to a proper length which is previously determined, the whole composite image, observed from the above-mentioned viewing point via the separate light paths, appears as the corresponding portions observed of the screen combined into an essentially continuous or coincident image.

This photographing apparatus includes on one of the separate light paths a refracting prism whose cross section faces the direction of the light rays of the corresponding light path, or the apparatus may have a pair of reflecting elements whose reflection surfaces are set up to have specific directions. The distortion of the observed image through one light path is adjusted to match the distortion of the observed image through the other light path in order to produce a true image of the picture on the screen of the cathode ray tube when observed from the viewing point.

DESCRIPTION OF THE DRAWINGS

FIG. 1 is a perspective view of the outline of the arrangement of constituent elements of a practical example of this invention.

FIG. 2 illustrates the distorted images observed by this apparatus when pictures are taken without the focusing feature of this invention.

FIG. 5 shows a normal domain and two other distorted domains.

DESCRIPTION OF THE PREFERRED EMBODIMENT

Figure 4:
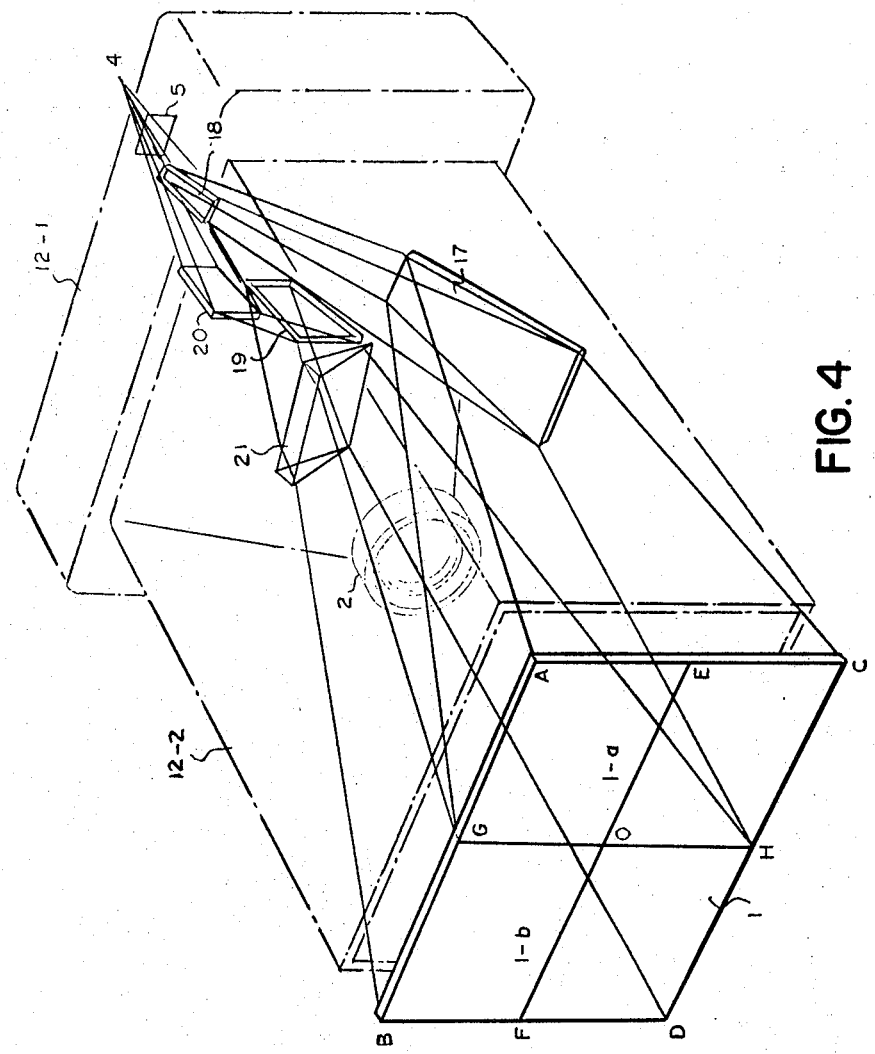
FIG. 4 indicates an oblique view of the outline of the arrangement of constitutional elements of a preferred embodiment of this invention.

This invention relates to a photographing apparatus which takes pictures of images displayed on the fluorescent surface (i.e., screen) of a cathode-ray tube oscilloscope, and specifically to a focus adjusting apparatus which is applied to adjust the distance between the screen and the camera to make clear and sharp images on a photosensitive film.

In photographing images displayed on the screen of the cathode ray tube, it is usual to photograph the displayed images at a short distance. Specifically, it is usual to use a large-sized photosensitive film and to take a picture when the magnification ratio is nearly 1 or exactly 1. Moreover, one can take clear and sharp photographs capable of distinguishing trace lines which are arranged on the fluorescent surface within about 0.1 mm separation. Consequently, to face the problem of an extremely shallow depth of field, for example, if the aperture is $f/1.2$ and the magnification ratio is 1, the depth of field is about 0.1 mm, a focus adjusting apparatus capable of adjusting very precisely the distance between the fluorescent surface and the camera is essential. In a conventional focusing operation, it is customary to have a focusing glass-plate placed in place of the photosensitive film and lens or the whole camera is moved along the optical axis of the lens while observing the focusing condition. However, the photographic operation of this method is tedious and it is impossible to adopt this method to photograph a phenomenon quickly and continuously with a camera using a roll-type film.

Consequently, the purpose of this invention is, without adopting a focusing with a focusing glass-plate, to provide a new photographing system for an oscilloscope which includes a focus adjusting apparatus which accomplishes a photographing operation quickly and conveniently.

FIG. 1 is the skeleton diagram of a perspective view of a preferred embodiment of the system of this invention. However, this diagram only indicates the mutual relationship arrangement among the constituent optical elements of a preferred embodiment. In this figure, the driving mechanisms of movable elements included in this device are omitted. Plane 1, in FIG. 1, illustrates the fluorescent surface or screen of a cathode ray tube and the rectangular plane bounded by ABDC indicates the photographed domain of the surface on which the images are displayed. The central point of the photographed domain is 0 and the line passing through the point 0 which is parallel to the horizontal line AB and CD is EF and the other line which is parallel to the vertical line AC and BD is GH. Generally, these horizontal or vertical lines are displayed with fine bright lines on the fluorescent surface 1 by means of some well-known method. Cylinder 2 illustrates the camera lens used to photograph the images displayed on the photographed domain or plane 1 of the fluorescent surface. The lens is arranged so that its optical axis coincides with the central axis X–X' which passes through the central point of the photographed domain 1 and intersects at right angles with the plane of the photographed domain. Plane 3 illustrates the photosensitive film plane of the camera. Naturally, the plane 3 intersects at right angles with the central axis X–X'. The point of intersection is 0'. A'B'D'C' is the domain on which the images of the photographed domain are formed. Furthermore, point 0'' indicates the intersection of X–X' and the central point of the lens 2. Length L1 indicates the distance between the fluorescent surface 1 and the lens 2, and L2 indicates the distance between the lens 2 and the photosensitive plane 3. In this embodiment, the interval L2 is constant but L1 can be adjusted by sliding the camera back and forth along the central axis X–X' and projecting the images of the photographed domain 1 on the photosensitive plane 3. Accordingly, a movable base 12–2, shown in FIG. 4, moves parallel to the central axis X–X' and serves as support for the camera and the elements of the focus adjusting apparatus which is described later. The following explanations are about the focus adjusting optical apparatus.

A small area viewfinder window 5 is located in the rear upper-center of the camera which accommodates the photosensitive films to observe the photographed domain. The aperture area of window 5 has sufficiently large dimensions to observe the whole area of the photographed domain 1 from a rear viewing point 4. In addition, a pair of mirrors 6 and 7 are mounted on the movable base 12 and the domain GHDB, which is the right half of the photographed domain 1, is reflected by these mirrors. Then the domain GHDB is observed through window 5. The domain AGHC which is the left half of domain 1 is only observed directly from viewing point 4. In addition to the above viewing conditions, mirrors 6 and 7 should satisfy the following additional conditions: when L1, which is the interval between photographed domain 1 and lens 2, is exactly adjusted in relation to L2, and display images of domain 1 are clearly focused on the photosensitive plane 3 through lens 2, the whole image of the photographed domain 1, which is observed through viewfinder window 5 from viewing point 4, is observed as a continuous image from the right half to the left half. In the actual apparatus, since there is a difference in the geometrical arrangement required to observe the left half of the domain 1 from viewing point 4 and the geometrical arrangement required to observe the right half of the domain 1 through mirrors 6 and 7, it is scarcely possible to observe the whole surface of photographed domain 1 from viewing point 4 as a perfectly continuous image. However, it is possible to arrange the mirrors to observe a continuous line which is displayed over the right half and the left half in domain 1, by adjusting distance interval L2 from viewing point 4 until a continuous line is produced which is almost equal to the original line. According to the preferred embodiment, mirrors 6 and 7 are arranged either on the left half to reflect segment 8, or on the right half to reflect segment 9 of the horizontal line EF which passes through central point 0 of the photographed domain 1 and extends over the right half and the left half of domain 1. EF is observed as a continuous line from the viewing point 4. FIG. 5i indicates the idealized image of the photographed domain 1 observed from the viewing point 4 when the above conditions are satisfied and the difference of the geometrical structure required to observe the right side and the left side is neglected.

Once the optical elements of the photographing apparatus indicated in FIG. 1 are arranged to satisfy the above conditions, and if the position of the photographed plane 1 is slid horizontally by +*l* or by −*l* as illustrated from the well-focused standard position, naturally, the image on photosensitive plane 3 corresponding to the display image on the photographed plane 1 will be out of focus and the left segment 8 and the right segment 9 of the horizontal line EF observed from the viewing point 4 will not be aligned. FIG. 5ii indicates the image observed from the viewing point for the position 1—1 to which the photographed plane 1 is slid from the standard position by +*l*. FIG. 5iii indicates the observed image which has moved the distance −*l*, and where the right half image and the left half image have slid up and down with respect to the horizontal line GH. Accordingly, exact focusing is obtained by adjusting the interval L1 and observing the horizontal line EF of the photographed domain until the segment 8 and 9 are aligned. Some well-known mechanism is used for adjusting L1.

In this invention one observes the photographed surface 1 from the viewing point 4 through at least two separate light paths. Then, the light path on one side, for example in FIG. 1, through which the left of the photographed surface is observed, is called the first light path and the other light path through which the right half is observed is called the second light path. The domains on the photographed surface observed through the first and the second light path are respectively called the first and the second observed domains.

In the embodiment shown in FIG. 1, the line EF used for focus adjusting extends over the first and the second observed domain, and the left half segment EO and the right half segment OF of line EF are observed from the viewing point 4 through the first light path and the second light path, respectively. The plane limited by ray 15 and ray 13 which begins with ends E and 0 of segment EO and passes through the first light path and reaches viewing point 4 is called the observation plane for the line EF by the first light path. And the plane limited by ray 14 and ray 16 which begins with ends O and F of the segment OF and pass through the second light path and reach viewing point 4 is called the observation plane for the line EF by the second light path. Central point O of the line EF is included in the first light path and also in the second light path, and in the present case, an included angle $\theta$ of the ray 13 and the ray 14 represents an included angle of observation planes for the line EF by the first and the second light paths. In this invention, both light paths arranged as the observation plane for the line which extends over the first and the second observed domains of the photographed domain by the first and the second light paths respectively meet the photographed domain at different angles holding the corresponding line between them. The sensitivity of focus adjusting increases as the included angle of both observing planes increases. As the observed domain is equally divided into the right half and the left half in the above embodiment, it is not necessary to divide the domain equally. For example, the same results are obtained by dividing the domain into the upper part and the lower part or by dividing the domain into the central part and the other part. Furthermore, it is not necessary that both observed domains be bordered by a line as in the above example. It is also desirable for the observed domains to be adjacent to each other or to overlap. Regarding adjustability, it is desirable that the domains be in contact or overlap. As the first observed domain is directly observed from the viewing point 4 and the second observed domain is only observed through reflection of the mirrors in the above embodiment, it is also possible to have both light paths possess reflectional or refractional elements in the corresponding observed domains as viewed from the viewing point 4. Moreover, it is possible to observe the whole of the observed domain simultaneously through separate light paths. In this case, the error from the standard interval between the photographed domain and the camera is observed as a double image of the observed line.

Figure 3:
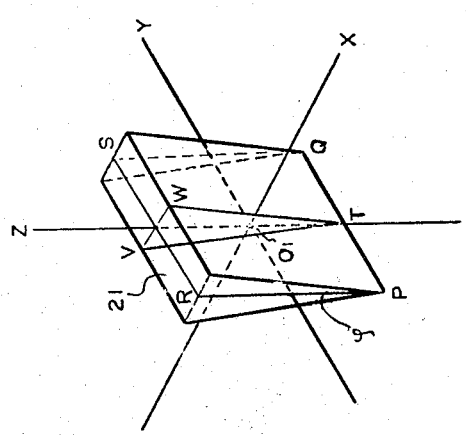
FIG. 3 illustrates a perspective view of a refractional prism used in the practical example of this invention.

In oscilloscope photographing, it is usual to take photographs close to a display surface where a viewfinder window is generally located at a distance from a central axis X-X'. Accordingly, the image of a photographed domain observed from viewing point 5 is a little distorted due to the differences of the geometrical structures between the viewing point and the respective points of the image. For instance, in FIG. 2 the image 1-a of the left half of the photographed domain is observed from the upper side through the first light path and the image 1-b of the right half is observed from the lower side through the second light path. FIG. 2i illustrates the distorted images of the observed domain in this case. The whole of the observed images 1-a and 1-b is distorted; thus, it is difficult to judge the point at which these two figures are perfectly coincident or made to look normal. Furthermore, since there is a difference between the average lengths of both light paths from the viewing point to the observed domains due to the insertion of the mirrors on one side of the light paths, a difference is created between the observed sizes of the images of both domains. FIG. 2ii illustrates the exaggerated images in this case. These phenomena prevent accurate focus adjusting. However, one of the characteristics of this invention is to correct these distorted observed images by inserting a wedge-shaped refractional prism on one side of the light paths so as to eliminate the above indicated defects. FIG. 3 illustrates a perspective view of the prism where a section including bisector PR, QS of vertical angle $\phi$ of the prism 21 is called the central section of the prism and where point $O_1$ is the central point of the central section. The X-axis passes through $O_1$ and meets at right angles with the central section of prism 21. Line $O_1Y$ meets at right angles with the X-axis and is contained in the central section as the Y axis. Line $O_1Z$ passes through $O_1$ and meets at right angles with the X-axis and the Y-axis is the Z-axis. This prism is inserted at a proper position on one side of the light paths so that the X-axis of the prism is made parallel to the central axis X-X' of the camera. And then, the prism is rotated about the Y-axis and the Z-axis of the prism. Let an angle of rotation about axis Y be $\alpha$ and an angle of rotation about axis Z be $\beta$. Then if the angles $\alpha$ and $\beta$ are properly chosen (for example, $\alpha = 14°$, $\beta = 42°$), it is possible to give a true picture of the image observed through the prism. In this case, the angle $\alpha$ mainly affects the vertical size of the image and the angle $\beta$ affects the distortion of the image. In this way, the distorted pictures illustrated in FIG. 2 are excluded and the function of the focus adjusting apparatus of this invention is certainly achieved.

FIG. 4 indicates a perspective view of the camera arrangement and in outline form the constituent elements of a preferred embodiment of the invention. Box 12-1 indicates the camera back which is attached to the camera and which accommodates photosensitive films. Box 12-2 indicates a chamber which shields the camera and the fluorescent surface 1 from outer light and in which box the elements of the focus adjusting mechanism are mounted. These parts 12-1 and 12-2 form the movable base 12 above-mentioned. These boxes are mounted on a base which is attached to an oscilloscope panel and can move on the base. The outlines of the boxes 12-1 and 12-2 are illustrated by broken lines so as to show the arrangement of the elements which are mounted within the boxes. In this practical example, plane AGHC which is a half of the photographed domain 1 is the first observed domain 1-a (FIG. 2) and the other half BGHD is the second observed domain 1-b (FIG. 2). Mirrors 17 and 18 are used in the first light path. Prism 21 and a pair of mirrors 19, 20 are used in the second light path for the correction of the observed image. The operation of the elements of this preferred embodiment have been explained before. It is possible to use the prism 21 to correct the distortion of the observed image by adjusting the directions of each of the mirrors 19, 20 properly. A prism is used in one side of the light paths in this preferred embodiment, but one may use another prism in the other light path and correct the image with mirrors. By adopting the photographing system of this invention, it is unnecessary to use a focusing glass plate exchangeable with the film. The operation is easy, because it is easy to obtain sharp focusing, individual difference of focusing disappears, and waste of films is prevented. Furthermore, if the apparatus has a sufficient range of view from the viewfinder window, observation of a phenomenon on the display surface is also possible in addition to focus adjusting.

We claim:

1. Apparatus for photographing an image on the screen of an oscilloscope, the apparatus comprising:
    a chamber having an opening at one end and having means for mounting said apparatus with said opening adjacent the screen of an oscilloscope, and having means for mounting a camera attachable thereto at a location remote from said opening in optical alignment with an axis substantially normal to the screen to be photographed when positioned in said opening;
    a port in said chamber remote from said opening for viewing the screen of an oscilloscope positioned in said opening;
    optical means interposed between said port and said opening for providing two separate light paths by each of which only a separate portion of a screen positioned in said opening may be viewed;
    said optical means including at least a first pair of mirrors in one of said light paths for reflecting light therealong from said opening to said port in a direction along a path which intersects a screen positioned in said opening at an angle which is different from the angle at which the other light path intersects a screen positioned in said opening; and
    means supporting said camera and said optical means and port in fixed spatial relationship for movement thereof along an axis substantially normal to a screen positioned at said opening.

2. Apparatus as in claim 1 comprising a prism mounted in one of the light paths to refract light rays propagating therealong.

3. Apparatus as in claim 1 comprising a second pair of mirrors disposed in the other of said light paths to reflect light from the associated portion of a screen positioned in said opening to a corresponding portion of the port along axes which define a plane oriented in orthogonal relation to a plane defined by the axes of light propagation along the light path including the first pair of mirrors.

* * * * *